(12) United States Patent
Yona

(10) Patent No.: US 8,566,444 B1
(45) Date of Patent: Oct. 22, 2013

(54) METHODS AND SYSTEM FOR SIMULTANEOUS MULTIPLE RULES CHECKING

(75) Inventor: Shlomo Yona, Kfar Yona (IL)

(73) Assignee: F5 Networks, Inc., Seattle, WA (US)

( * ) Notice: Subject to any disclaimer, the term of this patent is extended or adjusted under 35 U.S.C. 154(b) by 517 days.

(21) Appl. No.: 12/261,714

(22) Filed: Oct. 30, 2008

(51) Int. Cl.
*G06F 15/173* (2006.01)

(52) U.S. Cl.
USPC .......................................... 709/225; 709/223

(58) Field of Classification Search
USPC .............. 726/9, 26, 27, 28, 29; 713/224, 201, 713/212, 213, 220, 223; 709/204, 201, 220, 709/227; 707/600, 607, 608, 609, 687, 821; 380/200, 201, 202, 293, 227
See application file for complete search history.

(56) References Cited

U.S. PATENT DOCUMENTS

| | | | |
|---|---|---|---|
| 3,950,735 | A | 4/1976 | Patel |
| 4,644,532 | A | 2/1987 | George et al. |
| 4,897,781 | A | 1/1990 | Chang et al. |
| 4,965,772 | A | 10/1990 | Daniel et al. |
| 5,023,826 | A | 6/1991 | Patel |
| 5,053,953 | A | 10/1991 | Patel |
| 5,299,312 | A | 3/1994 | Rocco, Jr. |
| 5,327,529 | A | 7/1994 | Fults et al. |
| 5,367,635 | A | 11/1994 | Bauer et al. |
| 5,371,852 | A | 12/1994 | Attanasio et al. |
| 5,406,502 | A | 4/1995 | Haramaty et al. |
| 5,475,857 | A | 12/1995 | Dally |
| 5,517,617 | A | 5/1996 | Sathaye et al. |
| 5,519,694 | A | 5/1996 | Brewer et al. |
| 5,519,778 | A | 5/1996 | Leighton et al. |
| 5,521,591 | A | 5/1996 | Arora et al. |
| 5,528,701 | A | 6/1996 | Aref |
| 5,581,764 | A | 12/1996 | Fitzgerald et al. |
| 5,596,742 | A | 1/1997 | Agarwal et al. |
| 5,606,665 | A | 2/1997 | Yang et al. |
| 5,611,049 | A | 3/1997 | Pitts |
| 5,663,018 | A | 9/1997 | Cummings et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

F5 Networks Inc., "Configuration Guide for Local Traffic Management," F5 Networks Inc., Jan. 2006, version 9.2.2, 406 pgs.

(Continued)

*Primary Examiner* — Jeffrey Pwu
*Assistant Examiner* — Nega Woldemariam
(74) *Attorney, Agent, or Firm* — LeClairRyan, a Professional Corporation

(57) ABSTRACT

A method and system for checking data against a plurality of rules simultaneously. A data string having keywords in the data string is received. All of the keywords in the data string are simultaneously examined against rule keywords using for example, a finite state machine constructed by the Aho-Corasick algorithm. The rule keyword represents at least one rule of the plurality of rules. It is determined which of the plurality of rules are satisfied by the data string based on whether each keyword matches the rule keywords. Such rules may be used for application such as negative security policies.

30 Claims, 7 Drawing Sheets

(56) References Cited

U.S. PATENT DOCUMENTS

| | | |
|---|---|---|
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,411,986 B1 | 6/2002 | Susai et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,691,165 B1 | 2/2004 | Bruck et al. |
| 6,708,187 B1 | 3/2004 | Shanumgam et al. |
| 6,742,045 B1 | 5/2004 | Jordan et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,624,424 B2 | 11/2009 | Morita et al. |
| 7,680,915 B2 | 3/2010 | Still et al. |
| 8,130,650 B2 | 3/2012 | Allen, Jr. et al. |
| 2001/0023442 A1 | 9/2001 | Masters |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0225485 A1 | 12/2003 | Fritz et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0154837 A1 | 7/2005 | Keohane et al. |
| 2005/0187866 A1 | 8/2005 | Lee |
| 2006/0059267 A1 | 3/2006 | Cugi et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2007/0016662 A1 | 1/2007 | Desai et al. |
| 2007/0064661 A1 | 3/2007 | Sood et al. |
| 2007/0083646 A1* | 4/2007 | Miller et al. .................. 709/224 |
| 2007/0107048 A1 | 5/2007 | Halls et al. |
| 2007/0118879 A1 | 5/2007 | Yeun |
| 2007/0297551 A1 | 12/2007 | Choi |
| 2008/0034136 A1 | 2/2008 | Ulenas |
| 2008/0133518 A1* | 6/2008 | Kapoor et al. .................... 707/6 |
| 2008/0134311 A1 | 6/2008 | Medvinsky et al. |
| 2008/0148340 A1 | 6/2008 | Powell et al. |
| 2008/0201599 A1 | 8/2008 | Ferraiolo et al. |
| 2008/0256224 A1 | 10/2008 | Kaji et al. |
| 2008/0301760 A1 | 12/2008 | Lim |
| 2009/0049230 A1* | 2/2009 | Pandya ........................ 711/101 |
| 2009/0126525 A1 | 5/2009 | Pietsch et al. |
| 2009/0138749 A1 | 5/2009 | Moll et al. |
| 2009/0141891 A1 | 6/2009 | Boyen et al. |
| 2009/0228956 A1 | 9/2009 | He et al. |
| 2009/0287935 A1 | 11/2009 | Aull et al. |
| 2010/0122091 A1 | 5/2010 | Huang et al. |
| 2010/0150154 A1 | 6/2010 | Viger et al. |
| 2010/0251330 A1 | 9/2010 | Kroeselberg et al. |
| 2010/0325277 A1 | 12/2010 | Muthiah et al. |
| 2011/0047620 A1 | 2/2011 | Mahaffey et al. |
| 2011/0173295 A1 | 7/2011 | Bakke et al. |
| 2011/0321122 A1 | 12/2011 | Mwangi et al. |

(56) References Cited

U.S. PATENT DOCUMENTS

FOREIGN PATENT DOCUMENTS

| WO | WO 95/05712 | 2/1995 |
|----|-------------|--------|
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"A Process for Selective Routing of Servlet Content to Transcoding Modules," Research Disclosure 422124, Jun. 1999, pp. 889-890, IBM Corporation.

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Macvittie, Lori, "Message-Based Load Balancing," Technical Brief, Jan. 2010, pp. 1-9, F5 Networks, Inc.

Hochmuth, Phil, "F5, CacheFlow pump up content-delivery lines," Network World Fusion, May 4, 2001, 1 page, Las Vegas, Nevada.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

\* cited by examiner

METHODS AND SYSTEM FOR SIMULTANEOUS MULTIPLE RULES CHECKING

FIELD OF THE INVENTION

This invention generally relates to the application of multiple simultaneous keyword-based rules, and more particularly, to a system and methods for conversion of multiple rules to keywords that are matched in order to efficiently determine whether rules are satisfied in parallel.

BACKGROUND

With the widespread use of web-based applications and the Internet in general, concerns have been raised with the availability of server protection against malicious content sent through seemingly innocuous packets requesting access to server-based applications. Such packets may include viruses, data sniffers, or other undesirable and unauthorized requests to the application server. Some of the most serious network security threats come from attacks that target vulnerabilities in enterprise applications. In order to prevent the introduction of undesirable packets, networks implement so-called firewalls that examine incoming packets according to different rules that detect undesirable data in packets.

The application of different rules to examine incoming packets for content that has a undesirable effect is known as negative security. Negative security may be defined as a security approach that detects undesirable content (such as a virus, an attack, exploitation of a vulnerability, etc.) by maintaining a list of indicators such as patterns and signatures of the undesirable content. A rule includes a given representation of the undesirable content provided to a matching agent in order to check whether or not an item such as a packet contains the content that is represented in the list. An advantage of this approach is that if the undesirable content is known and how to find the content is known, then negative security is an easy and simple way to find undesirable content through the application of rules. The disadvantage to such an approach is that network protection is limited to existing rules and does not detect malicious packets that are written to circumvent existing rules. Network administrators therefore constantly update and add rules to detect new known threats. However, the application of multiple rules requires multiple passes over an incoming packet to check the rule, as each pass of the packet must be performed for each different rule. The use of more rules to detect new threats therefore increases computational overhead to the application of such rules for negative security.

SUMMARY

According to one example, a method for checking data against a plurality of rules simultaneously is disclosed. A data string having keywords in the data string is received. All of the keywords in the data string are simultaneously examined against rule keywords. The rule keywords represent at least one rule of the plurality of rules. Which of the plurality of rules are satisfied by the data string is determined based on whether each keyword matches the rule keywords.

Another example is a machine readable medium having stored thereon instructions for simultaneous checking whether a data string satisfies multiple rules. The machine readable medium includes machine executable code which when executed by at least one machine, causes the machine to receive the data string having keywords in the data string. The instructions further cause the machine to simultaneously examine all of the keywords in the data string against rule keywords, the rule keywords representing at least one rule of the plurality of rules. The instructions further cause the machine to determine which of the plurality of rules are satisfied by the data string based on whether each keyword matches the rule keywords.

Another example is a network traffic appliance for coupling to a network and allowing connection by a client computer to a device. The network traffic appliance includes a network interface for receiving a data string from the client computer. A network access module includes a finite state machine coupled to the network interface. A memory stores an array of keyword data structures and an array of rules data structures, the rules data structures including rule keywords associated with a plurality of rules. The network access module receives the data string having keywords in the data string. The network access module simultaneously examines all of the keywords in the data string against rule keywords, the rule keywords representing at least one rule of the plurality of rules. The network access module further determines which of the plurality of rules are satisfied by the data string based on whether each keyword matches the rule keywords. The network access module provides access to the device if certain of the plurality of rules is satisfied by the data string.

Additional aspects will be apparent to those of ordinary skill in the art in view of the detailed description of various embodiments, which is made with reference to the drawings, a brief description of which is provided below.

Figure 1:
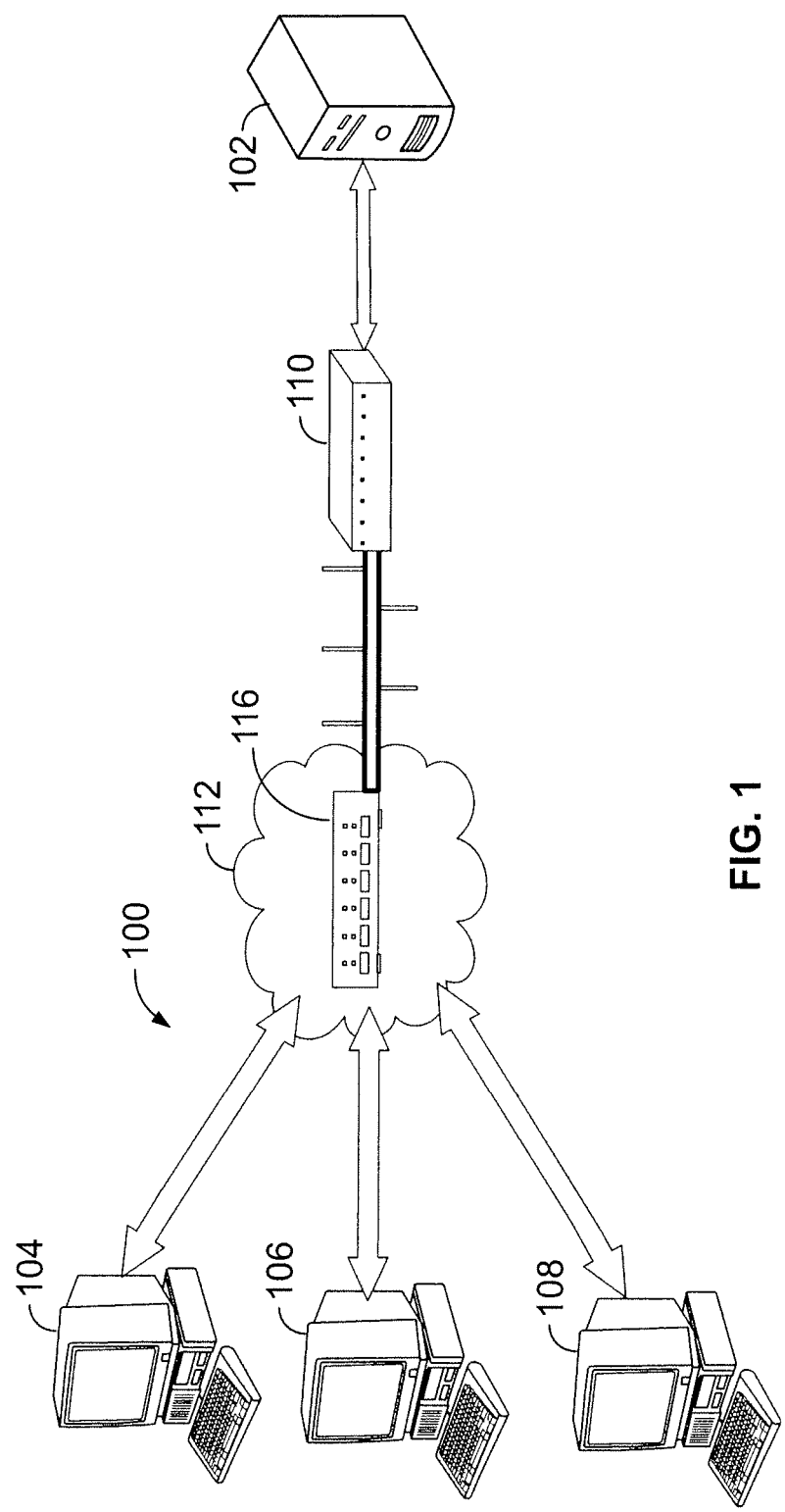
FIG. 1 is a block diagram of a network system using one example of a process allowing simultaneous evaluation of multiple rules by an access module using keyword matching.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Naively, rules-based access policies require multiple passes to examine data strings for undesirable content represented by each individual rule. Thus current rules based policies for server access require longer delay times to check for each individual rule decreasing data throughput.

FIG. 1 is a block diagram of an example system 100 that includes a server 102 that may be protected from malicious packets sent over a wide area network 112. The network 112 may provide responses and requests from external devices according to the HTTP-based application protocol in this example, but the principles discussed herein are not limited to this example and can include other application protocols such as non-TCP standards with similar characteristics. The system 100 may include a series of one or more external client computers 104, 106, and 108, and a network traffic manager 110 coupling the client computers 104, 106, and 108 through the wide area network 112. In this example, the network 112 is the Internet. The client computers 104, 106, and 108, in this example, may run web browsers which may provide an interface to make requests to different web server-based applications via the network 112. A series of web-based applications may run on the server 102 that allow the transmission of data that is requested by the client computers 104, 106, and 108. The server 102 may provide data in response to requests directed toward the respective applications on the server 102 from the client computers 104, 106, and 108. As per the TCP, packets may be sent to the server 102 from the requesting client computers 104, 106, and 108 to establish a connection or to send data for an existing connection. It is to be understood that the server 102 may be hardware or software or may represent a system with multiple servers that may include internal or external networks. In this example the server 102 may be any version of Microsoft® IIS servers or Apache® servers, although other types of servers may be used. Further, additional servers may be coupled to the network 112 and many different types of applications may be available on servers coupled to the network 112.

The network traffic appliance 110 may be interposed between the network 112 and the processor or processors of the server 102 as shown in FIG. 1. The network traffic appliance 110 may route data from the network 112 to the applications run by the processors on the server 102. As will be detailed below, the network traffic appliance 110 may receive packets that may include data requested for the server applications running on server 102 from the client computers 104, 106, and 108. The packets may be routed from the client computers 104, 106, and 108 to the server 102 via a router 116. In this example, the network traffic appliance 110 may perform several network traffic functions such as load balancing and validation. As will be explained below, the network traffic appliance 110 operates negative security policy based on multiple rules to determine whether data strings sent from external devices such as the client computers 104, 106, and 108 are allowed access to the server 102. It is to be understood that server 102 is a single server for example purposes only, other servers may be coupled to the network traffic appliance 110 or the server 102 may be a cluster of servers with load balancing functions performed by the network traffic appliance 110. Of course it is to be understood that such a cluster of servers may perform its own load balancing, fault tolerance and high availability in addition to other functions.

Figure 2:
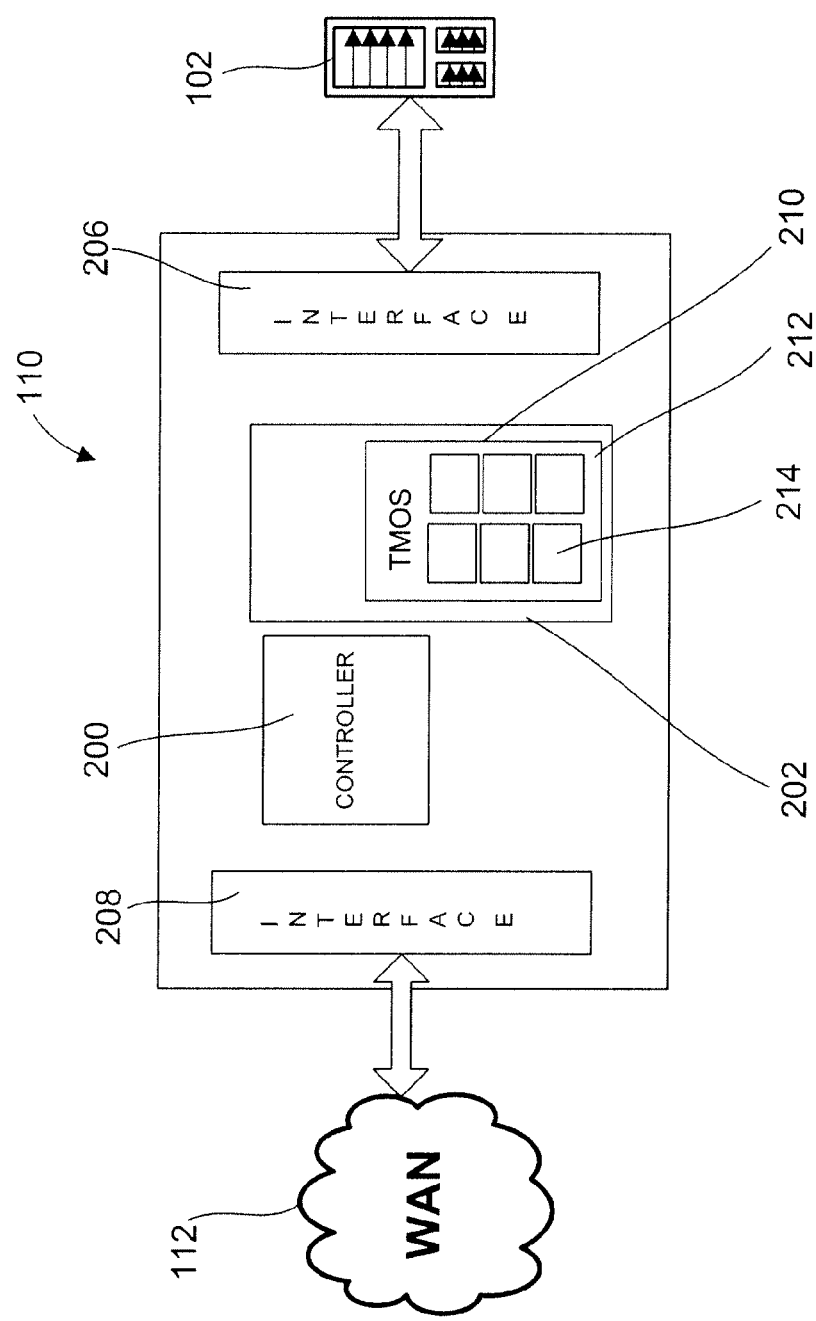
FIG. 2 is a block diagram of a network traffic manager of FIG. 1 running the access module.

FIG. 2 is a block diagram of the network traffic appliance 110 in FIG. 1. The network traffic appliance 110 may include a controller 200, a memory 202, and an interface 206 that may send responses to and receive requests from devices such as the client server 102 through the network 112 in FIG. 1. In this example, the interface 206 may be an Ethernet connection. The network traffic appliance 110 may have a wide area network interface 208 that may send requests to and receive responses from the wide area network 112 in FIG. 2. An example of a network traffic appliance 110 that may perform a security function such as a negative security policy is the BIG IP™ traffic manager product available from F5 Networks, Inc. of Seattle, Wash., although other network traffic controllers could be used.

A traffic management operating system (TMOS) 210 may be stored on the memory 202 and may be run by the controller 200. The traffic management OS 210 may have a modular structure with different modules 212 to perform various network traffic management functions. In this example, the modules 212 of the traffic management OS 210 may include a rules-based access module 214 embodying the principles discussed below to perform the negative security policy for multiple rules simultaneously. The access module 214 may also run on client computers or servers internally to allow access to the server 102 in the manner described below. It is also to be understood that the traffic management OS 210 with the access module 214 may be operated on any suitable traffic management device. An example of the access module 214 is the BIG-IP Application Security Manager (ASM) available from F5 Networks, Inc. of Seattle, Wash., which delivers comprehensive protection for Web applications and operational infrastructure.

An example of the traffic management OS 210 may be the TMOS platform available from F5 Networks, Inc. of Seattle, Wash., although other traffic management applications could be used. The traffic management OS 210 may provide functions such as performance, security, availability, and management. The traffic management OS 210 may provide shared application services such as iRules, rate shaping, resource cloaking, transaction assurance, universal persistence, caching, compression, encryption, authentication, application health monitors, and application switching, that are run by the application modules 212. The traffic management OS 210 may also provide shared network services including TCP Express™, protocol sanitization, high performance SSL, DoS and DDos protection, VLAN segmentation, line rate switching, IP packet filtering, dynamic routing, secure network address translation, port mapping, and common management framework.

Figure 3:
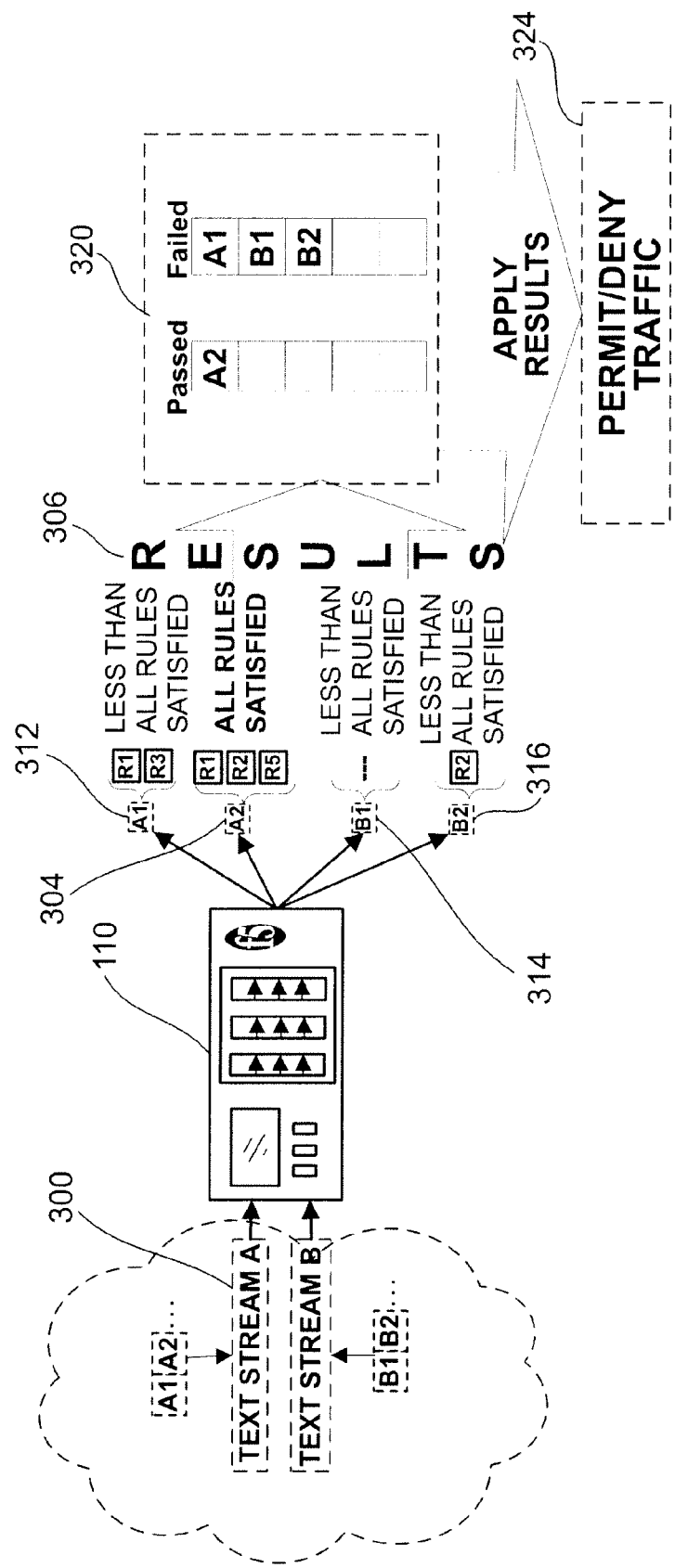
FIG. 3 is a block diagram of the process of filtering data strings by the network traffic manager in FIG. 2.

FIG. 3 is a general flow diagram showing the data stream handled by the access module 214 when data strings such as packets 300 are received by the network traffic appliance 110. The incoming stream of packets 300 is received by the network access module 214 in the network traffic appliance 110 and checked against rules to determine whether network access should be granted. A rule may be defined as a set of zero or more keywords that are combined with constraining operators in this example. A rule with zero keywords has a non-zero list of pending jobs and tasks. A rule may require keywords and constraints over the keywords in more than one context. Thus, a rule and associated constraints do not necessarily have to be on the same text or packet and therefore may be applied across multiple packets or parts of a packet to be examined. As will be explained below, the access module 214 may process incoming data in chunks that are not necessarily continuous. For example, the data stream of packets 300 in FIG. 3 may be two separate streams A and B that are not continuous. Such streams may result from different client computers sending data streams simultaneously resulting in data chunks being scanned as they arrive producing interwoven data chunks from both streams being sent to the network traffic appliance 110.

Optionally, a rule may include zero or more expressions that require a complete string for the matching process such as Perl compatible regular expression engine (PCRE) expressions. Such expressions require special handling as will be explained below. As will be explained below the example network access module 214 may allow each of the incoming packets to be compared against multiple rules simultaneously in a single pass. The multiple rules may be associated with keyword and rules data structures stored in the memory 202 of the network traffic appliance 110 in FIG. 2. The example keyword and rules data structures includes the rules and associated keywords and the constraints of the keywords. Different rules may be applied for different types of data such as different rules (R1-R5) required for one type of data such as A1 and rules (R1-R3) for another type of data such as A2. Similar rule requirements may be made for other types of data such as B1 and B2, which are not shown in detail in FIG. 3. In this example, the keyword data structure 302 may be compared against the incoming packets 300 using a finite state machine constructed with the Aho-Corasick algorithm. Of course other string searching algorithms may be used that may simultaneously determine the existence of multiple keywords in a data string to construct a finite state machine. Other hardware or software may be used other than a finite state machine. In this example, certain packets such as the packet 304 pass all of the applicable rules resulting in the application of the results 306 to pass the packets to the server 102 in FIG. 1. In other cases, certain packets 312, 314, and 316 may fail to satisfy one or more rules and therefore result in failure. In this example, the packet 304 may pass the three rules in this example. The results of the rules checks may be compiled (320). In this example, the packet 312 may only pass two of the three rules, the packet 316 may only pass one of the three rules and the packet 314 may not pass any of the three rules. The failures may be written into an optional failure file that lists the rules that were not satisfied by a particular packet such as the rules failed by packets A1 (shown in detail), B1, and B2. In this manner access may be granted for packets that pass all of the rules for access designated by the network administrator (324) such as the packet 304. In being able to determine whether all rules are satisfied by a single pass, the network access module 214 may increase efficiency of data transmittal to the server 102 while maintaining the security of such data. The process performed by the network access module 214 may be high performance and thread safe and may be used as a C programming language library and support chunked data and stream processing of the packets 300.

Figure 4:
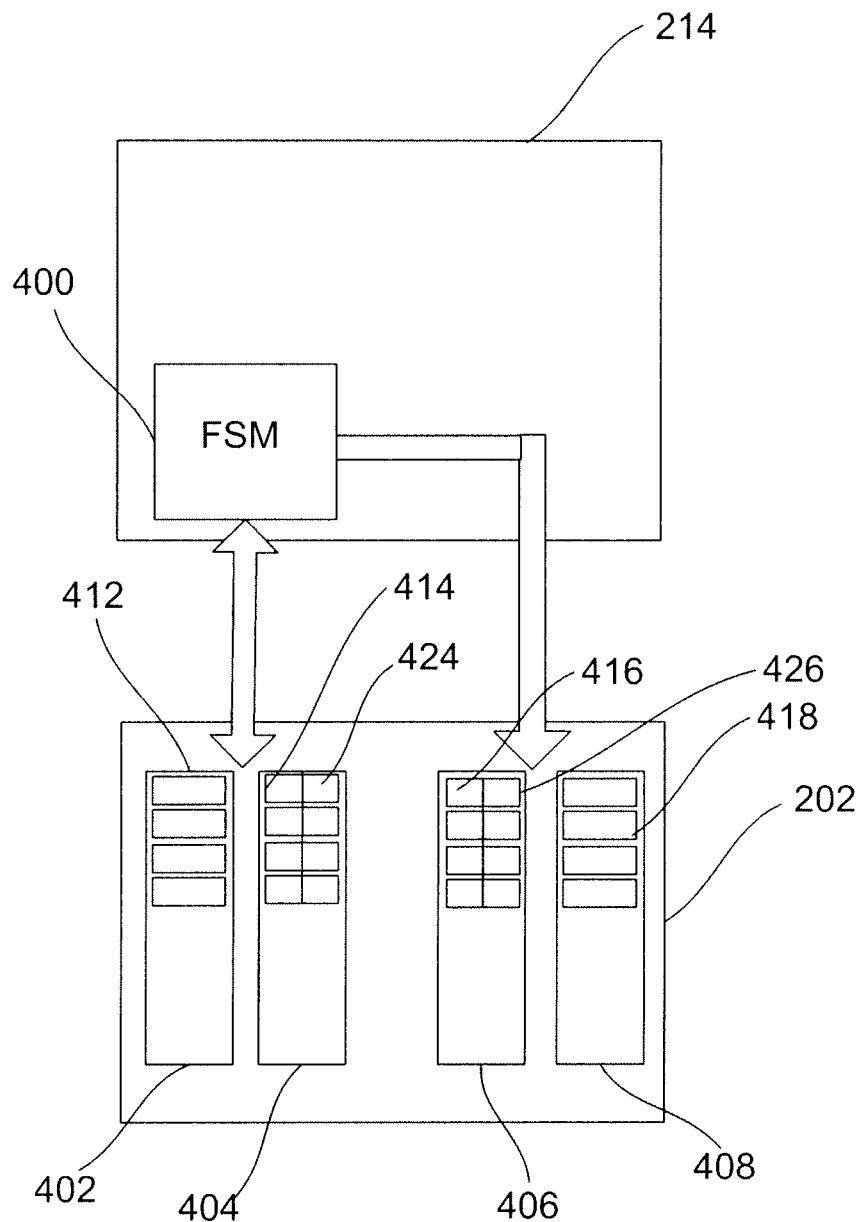
FIG. 4 is a block diagram of the data structures that are employed by the access module for simultaneous multiple rule checking.

FIG. 4 is a block diagram of the data structures and the access module 214 of FIG. 2 that may implement the simultaneous multiple rule checking process. The access module 214 may interface with a group of arrays of data structures stored in the memory 202. The access module 214 may include a finite state machine 400 set for keyword lookup. In this example, the finite state machine 400 may be implemented in software running on a generalized or dedicated process or in hardware. In this example, the finite state machine 400 may be constructed with the Aho-Corasick algorithm to examine strings of data for multiple keywords in a single pass. In this example, the Aho-Corasick algorithm may be used to construct the finite state machine 400 search strings based on locating elements of a set of strings or keywords simultaneously. The Aho-Corasick algorithm may support the simultaneous search of multiple keywords in chunked data and stream processing of data. The keywords may be correlated with the rules that the data string is to be examined in order to allow access in the network. Of course other string searching algorithms may be used that may simultaneously determine the existence of multiple keywords in a data string.

The memory 202 may store an array of keyword data structures 402, an array of rules data structures 404, an array of variable data structures 406 and a linked list of satisfied rules 408. The array of keyword data structures 402 may contain read only data structures 412 for all of the keywords and their respective properties and the rules that the keywords are associated with. The array of rules data structures 404 may hold read only data structures 414 and read/write data structures 424 that include the rules and a set of counters and flags and other properties along with a list of Perl compatible regular expression engine (PCRE) keywords that are associated with the respective rule. The array of variables 406 may contain read only data structures 416 and read/write data structure 426 including those variables that are responsible to keep track of whether the data string is clean or dirty and the true or false values and the resets that are used by the access module 214. The satisfied rules linked list 408 may contain links 418 that point to those rules that are satisfied by an examined data string and rules that are not satisfied by an examined data string. The split between read only data structures such as data structures 414 and 416 for the keywords and the rules and read/write data structures 424 and 426 may allow avoidance of corrupted values resulting from race conditions. The read only data structures may only be created in one copy for usage by all of the rules and keywords, while the read/write data structures may be created for each thread that uses them. Thread safety thus may be achieved allowing the read only data structures to be used concurrently without fear of race conditions.

Table 1 below shows an example read only data structure such as the data structure 412 for an array of keywords such as the array of keywords 402.

TABLE 1

EXAMPLE READ ONLY DATA STRUCTURE FOR KEYWORDS

| data type | member name | description | should be initialized to |
| --- | --- | --- | --- |
| unsigned char * | keyword | string representation of a keyword (contents of a content or a uricontent) or a pcre | NULL |
| Acy_keyword_length_in_bytes_t | keyword_length | length in bytes of the keyword member | 0 |
| Acy_flag_t | buffer | A descriptor listing the index of the input text buffer where the keyword should be located in. | 0 |
| Acy_flag_t | pcre | flag that takes value 1 if this is a pcre expression and 0 otherwise | 0 |
| void * | pcre_compiled | A pointer to the compiled pcre expression | NULL |
| Acy_flag_t | case_sensitive | A flag that takes value 1 if the keyword is case sensitive and 0 otherwise | 0 |

TABLE 1-continued

EXAMPLE READ ONLY DATA STRUCTURE FOR KEYWORDS

| data type | member name | description | should be initialized to |
| --- | --- | --- | --- |
| Acy_flag_t | negative | A flag that takes value 1 if the keyword is negated (i.e., should not be located in the text) and 0 otherwise. Note that negative keywords should not increment the count of num_non_pcre_keywords_to_match. | 0 |
| Acy_flag_t | prerequisite_keyword | A flag that takes value 1 if the keyword is a prerequisite for another keyword as its relative | 0 |
| Acy_array_index_t | abs_isdataat | number of bytes from the beginning of the text where a byte is expected | 0 |
| Acy_array_index_t | isdataat_relative_to_this | number of bytes from the end of the keyword where a byte is expected | 0 |
| Acy_array_index_t | abs_min_index_in_text | The minimum index in the input text buffer where the keyword is to be located. | 0 |
| Acy_array_index_t | abs_max_index_in_text | The maximum index in the input text buffer where the keyword is to be located. 0 means unlimited | UINT_MAX (from limits.h) |
| Acy_array_index_t | rel_min_index_in_text | The minimum index in the input text buffer where the keyword is to be located. The index is relative to the index of the last byte of the previous match | 0 |
| Acy_array_index_t | rel_max_index_in_text | The maximum index in the input text buffer where the keyword is to be located. 0 means unlimited. The index is relative to the index of the last byte of the previous match | UNIT_MAX (from limits.h) |
| Acy_array_index_t | relative_keyword_index | Index in the keywords array of the keyword that is expected to be the previous match in order to match this keyword. This index has no meaning if the min and max relative indices are set to 0 | 0 |
| Acy_index_list_item_t * | rules | A pointer to a linked list of rule indices (indices to the rules array), i.e., a listing of rules that require this keyword to be matched in order to be satisfied | NULL |

Table 2 below shows an example read only data structure such as the data structure 412 that may represent a single rule stored in the rules data structures array 404. The single rule is expected to be one instance per state machine such as the state machine 400 in FIG. 4.

TABLE 2

EXAMPLE READ ONLY DATA STRUCTURE FOR A SINGLE RULE

| data type | member name | description | should be initialized to |
| --- | --- | --- | --- |
| Acy_index_counter_t | num_keywords_to_match | Number of (non pcre) keywords that need to be matched in order to satisfy this rule | 0 |
| void * | user_data | A pointer to memory where the user of this library can store related data | NULL |

TABLE 2-continued

EXAMPLE READ ONLY DATA STRUCTURE FOR A SINGLE RULE

| data type | member name | description | should be initialized to |
|---|---|---|---|
| Acy_index_list_item_t * | pcres | A list of keyword indices. Every index refers to a keyword that has its pcre flag turned on, which makes it a pcre expression | NULL |

Table 3 below shows an example read/write data structure such as the read/write data structure 424 that may represent a single rule stored in the rules data structures array 404. The data structure in Table 3 is modified when the rule is checked in the data string.

TABLE 3

EXAMPLE READ/WRITE DATA STRUCTURE SINGLE RULE

| data type | member name | description | should be initialized to |
|---|---|---|---|
| Acy_index_counter_t | matched_keywords | number of keywords of this rule that were so far matched in text | 0 |
| Acy_index_counter_t | neg_matched_keywords | number of keywords with their negative flag turned on of this rule that were so far matched in text. Any number higher than 0 will deem the rule to be unsatisfied | 0 |
| Acy_array_index_t | next_satisfied | an index of another rule that is being chained to this one in a linked list of satisfied rules. The index is to be used via the linked list iterator only. | 0 |
| void * | user_data | A pointer to memory where the user of this library can store related data | NULL |

Table 4 below shows an example read/write data structure such as the data structure 424 including the data indicating satisfied rules such as the rules data structures array 404. The read/write data structure in Table 4 holds rules data that is aligned to the array of rules with a data structure similar to that in Table 2. The data structure 418 in Table 4 also includes utility pointers to the linked list of satisfied rules 408 to be used by a satisfied rules iterator as will be explained below.

TABLE 4

EXAMPLE READ/WRITE DATA STRUCTURE OF RULES

| data type | member name | description | should be initialized to |
|---|---|---|---|
| Acy_array_index_t | first_satisfied | index in the rules array to the first rule which is satisfied | 0 |
| Acy_array_index_t | last_satisfied | index in the rules array to the last rule which is satisfied | 0 |
| Acy_array_index_t | current_satisfied | index in the rules array to the current rule which is satisfied. This is used in the iterator that iterates over satisfied rules | 0 |
| Acy_index_counter_t | num_satisfied | number of satisfied rules | 0 |
| Acy_RWRule_t * | rule | An array (of *num_rules*, which is a member of *Rdas*) rules | NULL |

Table 5 below shows an example read only data structure such as the data structure 416 in the variables array 406 for variable values related to the implementation of the finite state machine 400 in FIG. 4.

TABLE 5

EXAMPLE READ ONLY DATA STRUCTURE OF FINITE STATE MACHINE VARIABLES

| data type | member name | description | should be initialized to |
|---|---|---|---|
| Acy_keyword_length_in_bytes_t | length_in_bytes_of_longest_case_sensitive_keyword | length in bytes of the longest case sensitive keyword | 0 |
| Acy_state_counter_t | num_states | Number of actual states in the state machine | 0 |
| Acy_state_t ** | g | transition table that gives the next state given the current state and the byte in the input. Size is num_states × 256, where 256 is the number of different characters that can be represented using 1 byte | NULL |
| Acy_state_t ** | delta | The final transition table that has the failure moves incorporated in it. num_states × 256 | NULL |
| Acy_state_t * | f | Failure table. Gives the next state given the current state of size num_states | NULL |
| Acy_queue_t ** | output | An array of size num_states. Every item in the array is a pointer to a queue containing indices to keywords. | NULL |
| Acy_index_counter_t | num_keywords | number of keywords in the keywords array | 0 |
| Acy_keyword_t * | keyword | the keywords array of size num_keywords | NULL |
| Acy_index_counter_t | num_rules | number of rules in the rules array | 0 |
| Acy_RRule_t * | rrule | rules array of size num_rules | NULL |
| Acy_keyword_length_in_bytes_t | fragment_suffix_length | should be twice the length in bytes of the longest case sensitive keyword | |

TABLE 6 shows an example read/write data structure such as the data structure 426 for utilities such as case sensitive manipulation, pointer to rules, visited flags for each keyword used by the finite state machine 400 in FIG. 4.

TABLE 6

EXAMPLE READ/WRITE DATA STRUCTURE OF FINITE STATE MACHINE VARIABLES

| data type | member name | description | should be initialized to |
|---|---|---|---|
| char * | fragment_suffix | memory of size twice the length in bytes of the longest case sensitive keyword | NULL |
| Acy_keyword_length_in_bytes_t | fragment_suffix_actual_length | The actual length of the suffix of a fragment written onto fragment_suffix. This is expected to be always the length in bytes of the longest case sensitive keyword in the collection, i.e., this length should be half the length of fragment_suffix_length | 0 |
| Acy_RWRules_t * | rules | points to the rules data structure which keeps the rules array and the linked list of the satisfied rules | NULL |
| Acy_flag_t * | pruned | An array of flags that takes value 1 if the keyword handling is done and 0 otherwise. The array indices are aligned with the indices of the keywords in the keyword array. | 0 |
| Acy_array_index_t * | last_match_index_in_text | An array with num_keywords flags, aligned to the same indices as the keywords array, where every entry lists the last index in the input text buffer where that keyword was matched. Default value per | NULL |

TABLE 6-continued

EXAMPLE READ/WRITE DATA STRUCTURE OF FINITE
STATE MACHINE VARIABLES

| data type | member name | description | should be initialized to |
|---|---|---|---|
| | | entry is 0. An entry makes sense if for the same entry in the pruned array the value is 1. | |

Every keyword may be either an explicit string or a Perl compatible regular expression engine implementation (PCRE) expression in this example. Of course, this process may be implemented with exclusively explicit strings without any PRCE expressions. A keyword may have one or more properties, according to the operations performed on the keyword (existence, non-existence, relativeness, absolute, distances for all the supported options, though the design can support many more operators). A keyword may participate in zero or more rules. A keyword belongs to some predefined input buffer type (context) and more than one buffer type may be defined (e.g., request context, response context, normalized url context in request, etc.).

Every entry in the rules data structure may contain a counter for the number of distinct keywords it requires to be seen in text and a counter for the number of keywords it requires not to be seen in text. Every keyword that is identified by the finite state machine 400 constructed with the Aho-Corasick algorithm may be checked against its properties and if the properties match, all the rules that require this keyword are updated in the read/write data structures 424 of the rules array 404. This is done only once per keyword so future occurrences are not consuming work as the result is already cached in the data structures 424 of the rules array 404. A rule that is being updated with a keyword checks if this keyword is the last one needed for it to be satisfied, and if this rule is the last one, a pointer to the rule is added to the satisfied rules linked list 408.

Boolean flags exist for the keywords and the rules for their respective data structures. There may be a large number of keywords and rules to examine for each of the data strings. This may cause a linear amount of work to reset a large number of flags. One option may be to trade the linear complexity for reset with an amortized O(1) complexity with respect to the number of flags. The semantics of true and false may be changed to the following: true is a number that is being defined and incremented whenever a reset is required. False is therefore any number that is not this defined value. This allows the cost of reset to be the amount of work required to increment an integer by 1. Of course, the integers may have a maximum value so it is also required to check if an increment will cause an overflow. If an overflow is expected in the next step, a full linear reset (that is assign 0 to all flags and define true to be 1) is conducted. Since an overflow is expected for an unsigned integer every 2 to the power of 32, this scales to an amortized O(1) work value per reset.

In order to increase efficiency, counters may also be reset for each data string to be examined. Counters may exist for rules and keywords in the data structures, which are marked for the last occurrence index for every seen keyword in a string. Reset of the counters may require linear amount of work with respect to the number of counters. The resets may be held to the minimum number of resets necessary by applying a so-called lazy reset (i.e., the reset only occurs if a counter is dirty). The dirty flag per counter is a Boolean flag that is being reset using the previously explained process for true and false flags. In this manner, only counters that are actually being used are reset for the keyword and rules data structures.

The above process and implementation therefore may be used to speed the access checks for screening packets to the server 102 by checking multiple rules in one pass for a data string. This allows the ability to look up rules and not only keywords. The rules may require the existence or non-existence of one or more keywords and apply custom functionality when a keyword is seen in a data string. More complex rules may be composed via operators on different keywords. The access check may work with full text, chunked text, and streaming text and allows multiple concurrent instances serving one or more sets of rules. This process also supports rules having multiple contexts.

Figure 5:
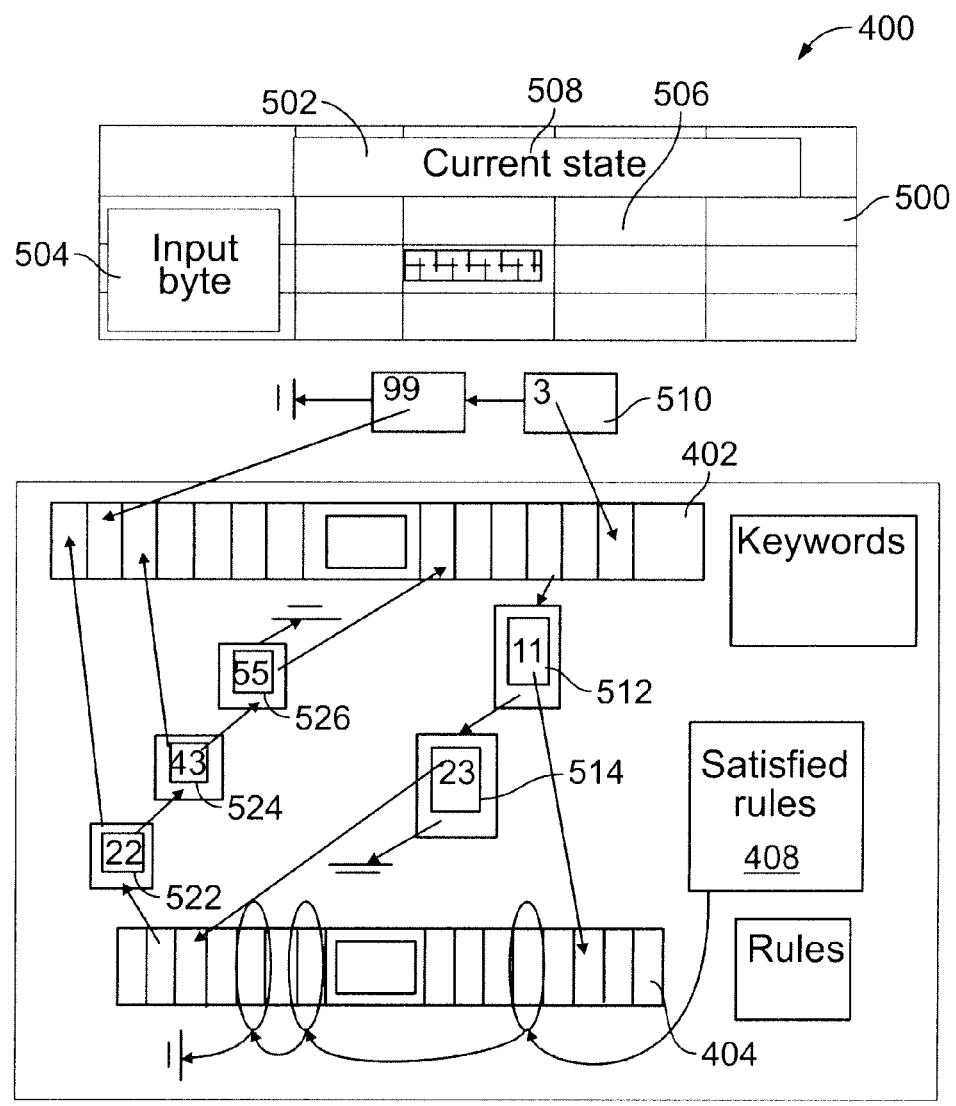
FIG. 5 is a diagram of the flow of data between various data structures that are employed by the access module in FIG. 2.

FIG. 5 is a diagram of the process for simultaneously checking multiple rules using keyword evaluation based on the data arrays 402, 404 and 406 and the finite state machine 400 in FIG. 4. FIG. 5 shows an example state table 500 that may be used by the finite state machine 400 constructed with the Aho-Corasick algorithm. The state table 500 includes current states 502 representing the current state and input characters 504 from the data string that define the various next states 506 in the state table 500. For example, a certain cell 508 may be an accepting state representing a linked list of keywords indicating one or more keywords are matched.

In this example, a certain keyword 510 may be associated with an accepting state such as the accepting state represented by the cell 508. Since the rule keyword may be found in the input data string, a matched keyword-linked list points to the different words that could be represented in the keyword array 402. The constraints of a keyword may be listed in its entry in the keywords array 402. Alternatively, the linked list may also include constraints associated with the keyword. The rules data structure the keyword points to is examined and the access module 214 determines whether constraints are satisfied and incorrect matches are pruned out. The keyword 510 in this example includes pointers to two different rules 512 (11) and 514 (23) determined from the keyword array 402. Once the keyword 510 is matched, the respective data structures of the array of rules data structures 404 are updated to indicate that the rules 512 and 514 are satisfied for the keyword 510. For example, the counters for the data structures for the rule 512 (11) and the rule 514 (23) indicating the number of keywords satisfied for each rule are incremented. If the number of satisfied keywords is reached, a check is performed whether the rule is a negative rule (i.e., if all keywords are present, the rule is not satisfied). If the counter reaches the predetermined number of keywords, the rule may be marked as satisfied and updated in the satisfied rules linked list 408.

Since PCRE expressions do not (properly) support streaming or chunked data, checking such expressions may be postponed until all the data string with the PCRE expression is available or may be linked to a linked list of satisfied rules. In this example, the keyword 522 (22) represents a rule requiring a PCRE keyword. Since the keyword 522 is a PCRE expression, the rules checking may be performed post processing, by examining satisfied rules and perform what is needed (i.e., PCRE processing). The links between keywords and rules are created off line. The keywords 522 (22), 524 (43), and 526 (55) therefore constitute a linked list of keywords for a PCRE expression that should be applied post processing and therefore are postponed for post processing.

Each of the server 102, network traffic appliance 110, and client computers 104, 106, and 108 may include a central processing unit (CPU), controller or processor, a memory, and an interface system that are coupled together by a bus or other link, although other numbers and types of each of the components and other configurations and locations for the components can be used. The processors in the server 102 or the network traffic appliance 110 may execute a program of stored instructions for one or more aspects of the methods and systems as described herein, including for rapid protection of the network via simultaneous checking according to access rules, although the processor could execute other types of programmed instructions. The memory may store these programmed instructions for one or more aspects of the methods and systems as described herein, including the method for protecting the server against denial of service attacks, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the server 102, network traffic appliance 110, and client computers 104, 106, and 108 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 6:
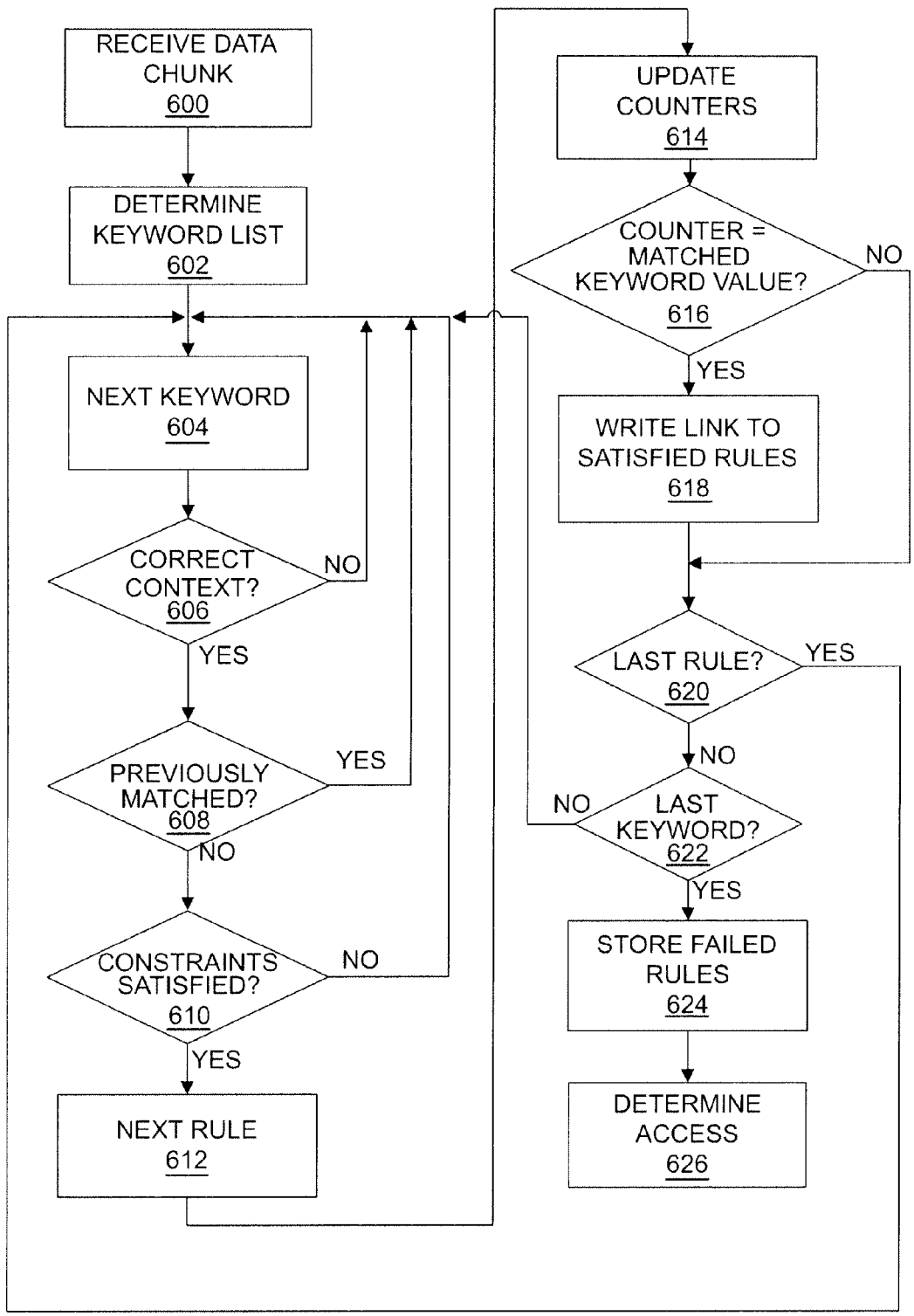
FIG. 6 is a flow chart of methods for simultaneous, multiple rules evaluation performed by the example access module in FIG. 2.

The operation of the example rapid protection of the network via simultaneous checking according to access rules, shown in FIG. 6, which may be run on the access module 214 in the example network traffic appliance 110, will now be described with reference to FIG. 1 in conjunction with the flow diagram shown in FIG. 6. The flow diagram in FIG. 6 is representative of example machine readable instructions for implementing the rapid protection of the network via simultaneous checking according to multiple access rules. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the network traffic appliance 110 or the access module 214 could be implemented by software, hardware, and/or firmware. Also, some or all of the machine readable instructions represented by the flowchart of FIG. 6 may be implemented manually. Further, although the example algorithm is described with reference to the flowchart illustrated in FIG. 6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 6 is a flow diagram of the on-line matching process that allows multiple simultaneous checking of rules in a data string. In FIG. 6, a packet including a data string may be initially received from the network 112 by the network traffic appliance 110 via the router 116 and the Ethernet connection 206 in FIGS. 1 and 2. The new chunk of text from the data may be scanned one byte at a time against the finite state machine 400 of the keywords related to the rule. (600). In this example, the received packets may be in a TCP format with a header and a payload including the data string or part of the data string to be examined. The access module 214 may derive a list of all possible keywords from the data string that were matched against the list of rules keywords via running the finite state machine 400 in FIG. 4 constructed with the Aho-Corasick algorithm (602). This is done by running the bytes of the data stream over the finite state machine 400 in FIG. 4. The access module 214 may then begin with the next keyword in the list of keywords (604). The access module 214 may then determine whether the keyword is in the correct buffer or context (606). If the keyword is not in the correct context, the access module 214 may loop back to the next keyword (604). If the keyword is in the correct context, the access module 214 may then determine whether the keywords in the data structure were previously matched with the keywords from the data string by determining whether the appropriate flag was set for the keyword (608). If the keyword was previously matched to the rules, the keyword does not have to be checked in this and future iterations and the access module 214 may return and process the next keyword (604). If a particular keyword is present and has not been previously matched to a rule, the access module 214 may determine whether the keyword satisfies all the constraints, if any, associated with the keyword (610). If the keyword does not satisfy the constraints, the access module 214 may loop back to the next keyword (604).

If the keyword is in the correct context, the access module 214 will access the next rule (612). The access module 214 will increment the counters in the rules data structure 424 for the first rule associated with the keyword (614). The counters may include the occurrence counter representing the number of keywords matching the data string and the non-occurrence counter. If the rule has a counter value equal to the number of expected matched keywords value, the access module 214 may write the rule into the list of satisfied rules data structure 408 (618). The access module 214 may then proceed to determine whether the rule is the last rule in the rule array 404 in FIG. 4 (620). If the rule is not the last rule the access module 214 may loop back to access the next rule (612). If the rule is the last rule (620), the access module 214 may then proceed to determine whether the keyword is the last keyword in the data string (622). If the keyword is not the last keyword, the access module 214 may loop back to examine the next keyword (604).

If the keyword is the last keyword in the list (622), the access module 214 may store the rules that are found to be unsatisfied (618). At the end of the process, the access module 214 summarizes the satisfied rules and may determine whether the packet should be granted access to the server 102 based on the satisfied rules (620). Of course it is to be understood that negative keywords may be evaluated using an the opposite process. For negative keywords, the rule may be satisfied if the counter is not at the expected value while the rule fails if the counter is at the expected value.

In the case where the keyword is a PCRE expression, the access module 214 may determine whether the entire list of rules is satisfied for a PCRE expression when the last chunk of text is being reached. If the data string is complete in relation to the PCRE expression, the access module 214 may proceed to checking for the rules.

Figure 7:
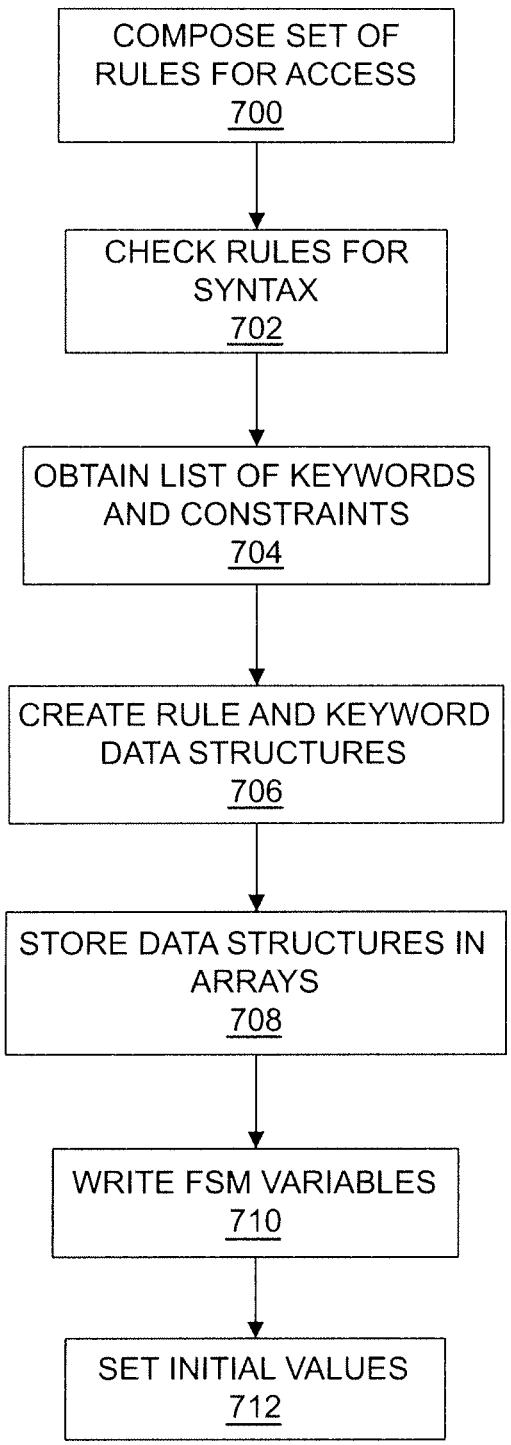
FIG. 7 is a flow chart of methods for the construction and serialization of data structures used by the access module in FIG. 2.

FIG. 7 shows the off-line process to create data structures such as those shown in FIG. 4 for simultaneous multiple rules checks for the on-line process shown in FIG. 6. The process may compose a set of rules either manually or automatically for a particular policy such as negative security (700). The set of rules may be checked to determine the rules are in the proper syntax according to the selected rules language (702). The process then may obtain a list of keywords and constraints for incorporation in the data structure associated with each of the set of rules (704). The association between keywords and rules are maintained in the data structure. The process may proceed to gather a list of rules and associated keywords for incorporation in the read and read/write data structures (706). The data structures with the appropriate associations between keywords and rules may then be stored in the respective arrays in memory (708). After the list of keywords and rules is gathered and the data structures are constructed from the relationships of the keywords and the rules, the variables for the finite state machine may be written (710). Finally, the initial variables such as the counters may be set to initial values (712). After the process in FIG. 7 is completed, the arrays of data structures 402, 404, 406, and 408 in the memory 202 shown in FIG. 4 are ready for the multiple simultaneous rule checking process described with reference to FIG. 6.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-security applications involving rules-based examinations requiring finding things in text strings may employ the described process. These may include but not be limited to content-based routing, search engines, billing systems, service level agreement enforcement, text processing, editing, parsers, and compilers. Another application may be for the detection of patterns in text, images or binaries such as the detection of market changes in financial data or news item text or content filtering such as spam filtering. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for filtering network packets, the method comprising:
   receiving, with the network traffic appliance, a data string associated with one or more of the network packets and identifying one or more keywords in the data string;
   iteratively examining, with the network traffic appliance, the one or more keywords in the data string against at least one rule keyword associated with each of a plurality of rules to determine whether the one or more keywords matches at least a portion of the at least one rule keyword for each of the plurality of rules, wherein each of the plurality of rules represents one or more network access policies;
   updating, with the network traffic appliance, a counter associated with each of the plurality of rules for each of the one or more keywords that matches the at least a portion of the at least one rule keyword associated with each of the plurality of rules;
   determining, with a network traffic appliance, whether the updated counter associated with each of the plurality of rules is equal to a preset matched keyword value for each of the plurality of rules;
   writing, with the network traffic appliance, one or more of the plurality of rules into a list of satisfied rules associated with the data string when it is determined that the updated counter associated with the one or more of the plurality of rules is equal to the preset matched keyword value for the one or more of the plurality of rules; and
   determining, with the network traffic appliance, whether to grant access of the one or more network packets to at least one server based on the list of satisfied rules.

2. The method of claim 1, wherein the examination is performed by a finite state machine operational according to an Aho-Corasick algorithm and the data string is either full text, chunked text, or streaming text.

3. The method of claim 1, wherein the keywords are stored as keyword data structures in a keywords array and the rules are stored as rules data structures in a rules array.

4. The method of claim 3, wherein each of the plurality of rules is associated with at least one keyword and the rules data structures each include a counter representing the number of keywords matching the data string, and wherein the rule is satisfied when the counter is equivalent to an expected number of keywords value.

5. The method of claim 3, wherein the keyword data structure and the rules data structure includes a flag indicating a match, the flag having a true value and a false value, the flag being reset by incrementing the true value and the rules data structures and the keyword data structures are reset only when the counter is dirty.

6. The method of claim 3, wherein the rules data structures and the keyword data structures are read only and allow simultaneous access by different threads of keyword matching.

7. The method of claim 1, wherein when a keyword is determined to be matched, the corresponding matching rules are flagged and a second occurrence of the keyword is not checked in future iterations.

8. The method of claim 1, wherein each rule is satisfied when a plurality of keywords match a plurality of keywords associated with the rule and each rule is not satisfied when a plurality of keywords match a plurality of keywords associated with the rule.

9. The method of claim 1, further comprising:
determining, with the network traffic appliance, whether the keyword is a Perl Compatible Regular Expression (PCRE) expression;
buffering, with the network traffic appliance, the keyword when it is determined that the keyword is a PCRE expression; and
proceeding, with the network traffic appliance, with determining which of the plurality of rules are satisfied by the data string based on whether each keyword matches the rule keywords when the PCRE expression is completed.

10. The method of claim 1, wherein the rule keywords include at least one constraint and wherein a corresponding rule is satisfied when the at least one constraint is satisfied.

11. A non-transitory machine readable medium having stored thereon instructions for filtering network packets, comprising machine executable code which when executed by at least one processor, causes the processor to perform steps comprising:
receiving a data string associated with one or more of the network packets and identifying one or more keywords in the data string;
iteratively examining the one or more keywords in the data string against at least one rule keyword associated with each of a plurality of rules to determine whether the one or more keywords matches at least a portion of the at least one rule keyword for each of the plurality of rules, wherein each of the plurality of the rules represents one or more network access policies;
updating a counter associated with each of the plurality of rules for each of the one or more keywords that matches the at least a portion of the at least one rule keyword associated with each of the plurality of rules;
determining whether the updated counter associated with each of the plurality of rules is equal to a preset matched keyword value for each of the plurality of rules;
writing one or more of the plurality of rules into a list of satisfied rules associated with the data string when it is determined that the updated counter associated with the one or more of the plurality of rules is equal to the preset matched keyword value for the one or more of the plurality of rules; and
determining whether to grant access of the one or more network packets to at least one server based on the list of satisfied rules.

12. The machine readable medium of claim 11, wherein the examination is performed by a finite state machine operational according to an Aho-Corasick algorithm and the data string is either full text, chunked text, or streaming text.

13. The machine readable medium in claim 11, wherein the keywords are stored as keyword data structures in a keywords array and the rules are stored as rules data structures in a rules array.

14. The machine readable medium of claim 13, wherein each of the plurality of rules is associated with at least two keywords and the rule data structure includes a counter representing the number of keywords matching the data string, and wherein the rule is satisfied when the counter is equivalent to an expected number of keywords value.

15. The machine readable medium of claim 14, wherein the keyword data structure and the rules data structure includes a flag indicating a match, the flag having a true value and a false value, and wherein the instructions cause the machine to reset the flag by incrementing the true value and the rules data structures and the keyword data structures are reset only when the counter is dirty.

16. The machine readable medium of claim 14, wherein the rules data structures and the keyword data structures are read only and allow simultaneous access by different threads of keyword matching.

17. The machine readable medium in claim 11, wherein when a keyword is determined to be matched, the corresponding matching rules are flagged and a second occurrence of the keyword is not checked in future iterations.

18. The machine readable medium in claim 11, wherein each rule is satisfied when a plurality of keywords match a plurality of keywords associated with the rule and each rule is not satisfied when a plurality of keywords match a plurality of keywords associated with the rule.

19. The machine readable medium in claim 11, wherein the instructions cause the machine to:
determine whether the keyword is a Perl Compatible Regular Expression (PCRE) expression;
buffer the keyword when it is determined that the keyword is a PCRE expression; and
proceed with determining which of the plurality of rules are satisfied by the data string based on whether each keyword matches the rule keywords when the PCRE expression is completed.

20. The machine readable medium in claim 11, wherein the rule keywords include at least one constraint and wherein a corresponding rule is satisfied when the at least one constraint is satisfied.

21. A network traffic appliance for filtering network packets, the network traffic appliance comprising:
one or more processors and a network interface, at least one of the processors or the network interface configured to be capable of executing instructions to implement:
receiving a data string associated with one or more of the network packets and identifying one or more keywords in the data string;
iteratively examining the one or more keywords in the data string against at least one rule keyword associated with each of a plurality of rules to determine whether the one or more keywords matches at least a portion of the at least one rule keyword for each of the plurality of rules, wherein each of the plurality of the rules represents one or more network access policies;

updating a counter associated with each of the plurality of rules for each of the one or more keywords that matches the at least a portion of the at least one rule keyword associated with each of the plurality of rules;

determining whether the updated counter associated with each of the plurality of rules is equal to a preset matched keyword value for each of the plurality of rules;

writing one or more of the plurality of rules into a list of satisfied rules associated with the data string when it is determined that the updated counter associated with the one or more of the plurality of rules is equal to the preset matched keyword value for the one or more of the plurality of rules; and determining whether to grant access of the one or more network packets to at least one server based on the list of satisfied rules.

22. The network traffic appliance in claim 21, wherein the examination is performed by a finite state machine operational according to an Aho-Corasick algorithm and the data string is either full text, chunked text, or streaming text.

23. The network traffic appliance in claim 21, wherein the keywords are stored as keyword data structures in a keywords array and the rules are stored as rules data structures in a rules array.

24. The network traffic appliance in claim 23, wherein each of the plurality of rules is associated with at least two keywords and the rule data structure includes a counter representing the number of keywords matching the data string, and wherein the rule is satisfied when the counter is equivalent to an expected number of keywords value.

25. The network traffic appliance in claim 24, wherein the keyword data structure and the rules data structure includes a flag indicating a match, the flag having a true value and a false value, and wherein the instructions cause the machine to reset the flag by incrementing the true value and the rules data structures and the keyword data structures are reset only when the counter is dirty.

26. The network traffic appliance in claim 24, wherein the rules data structures and the keyword data structures are read only and allow simultaneous access by different threads of keyword matching.

27. The network traffic appliance in claim 21, wherein when a keyword is determined to be matched, the corresponding matching rules are flagged and a second occurrence of the keyword is not checked in future iterations.

28. The network traffic appliance in claim 21, wherein each rule is satisfied when a plurality of keywords match a plurality of keywords associated with the rule and each rule is not satisfied when a plurality of keywords match a plurality of keywords associated with the rule.

29. The network traffic appliance in claim 21, wherein the instructions cause the machine to:
   determine whether the keyword is a Perl Compatible Regular Expression (PCRE) expression;
   buffer the keyword when it is determined that the keyword is a PCRE expression; and
   proceed with determining which of the plurality of rules are satisfied by the data string based on whether each keyword matches the rule keywords when the PCRE expression is completed.

30. The network traffic appliance in claim 21, wherein the rule keywords include at least one constraint and wherein a corresponding rule is satisfied when the at least one constraint is satisfied.

* * * * *